(12) United States Patent
Boczer et al.

(10) Patent No.: US 7,967,875 B2
(45) Date of Patent: Jun. 28, 2011

(54) FLEXIBLE CATHODES

(75) Inventors: Christopher Boczer, Shelton, CT (US);
Frank M. Delnick, Southbury, CT (US);
Rosauro Del Rosario, Danbury, CT (US); Minkoo Kang, New Milford, CT (US); Lucyna M. Pawlowska, Norwalk, CT (US); Michael Pozin, Brookfield, CT (US); Dharmendra Rana, Danbury, CT (US); Maya Stevanovic, Framingham, MA (US); John J. Weckesser, Oxford, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 12/791,221

(22) Filed: Jun. 1, 2010

(65) Prior Publication Data

US 2010/0236056 A1    Sep. 23, 2010

Related U.S. Application Data

(63) Continuation of application No. 12/408,869, filed on Mar. 23, 2009, now Pat. No. 7,753,968, which is a continuation of application No. 11/375,537, filed on Mar. 14, 2006, now Pat. No. 7,527,895, which is a continuation of application No. 10/290,832, filed on Nov. 8, 2002, now Pat. No. 7,033,698.

(51) Int. Cl.
*H01M 4/13* (2010.01)
*H01M 4/62* (2010.01)
*H01M 10/0568* (2010.01)
*H01M 10/0569* (2010.01)

(52) U.S. Cl. ........ 29/623.5; 429/199; 429/217; 429/329

(58) Field of Classification Search .................. 429/199, 429/217, 221, 337, 341, 329; 29/623.5
See application file for complete search history.

(56) References Cited

U.S. PATENT DOCUMENTS 4,279,972 A    7/1981    Moses
(Continued)

FOREIGN PATENT DOCUMENTS

EP    1 154 501 A2    11/2001
(Continued)

OTHER PUBLICATIONS

Ishikawa et al., "Pretreatment of Li metal anode with electrolyte additive for enhancing Li cycleability", Journal of Power Sources, 146, pp. 199-203, 2005.
(Continued)

*Primary Examiner* — Stephen J. Kalafut
(74) *Attorney, Agent, or Firm* — Fish & Richardson P.C.

(57) ABSTRACT

This disclosure relates to methods of making a cathode for a lithium batter. The methods include: (a) treating a cathode current collector with flame or corona; (b) coating a slurry containing iron disulfide, a first solvent, and a binder onto the cathode current collector obtained from step (a) to form a coated cathode current collector, in which the slurry contains about 73-75% by weight solids and the binder contains a polymer selected from the group consisting of linear di- and tri-block copolymers, linear tri-block copolymers cross-linked with melamine resin, ethylene-propylene copolymers, ethylene-propylene-diene terpolymers, tri-block fluorinated thermoplastics, hydrogenated nitrile rubbers, fluoro-ethylene-vinyl ether copolymers, thermoplastic polyurethanes, thermoplastic olefins, and polyvinylidene fluoride homopolymers; and (c) drying the coated cathode current collector obtained from step (b) to provide a cathode, in which the cathode contains no more than 0.5% by volume of the first solvent and is capable of being bent to 180°. This disclosure also relates to methods of making a lithium battery.

24 Claims, 2 Drawing Sheets

U.S. PATENT DOCUMENTS

| | | | |
|---|---|---|---|
| 4,401,735 A | 8/1983 | Moses et al. | |
| 4,450,214 A | 5/1984 | Davis | |
| 4,463,072 A | 7/1984 | Gifford et al. | |
| 4,489,144 A | 12/1984 | Clark | |
| 4,526,846 A | 7/1985 | Kearney et al. | |
| 4,952,330 A | 8/1990 | Leger et al. | |
| 5,176,968 A | 1/1993 | Blasi et al. | |
| 5,219,683 A | 6/1993 | Webber | |
| 5,229,227 A | 7/1993 | Webber | |
| 5,290,414 A | 3/1994 | Marple | |
| 5,432,030 A | 7/1995 | Vourlis | |
| 5,514,491 A | 5/1996 | Webber | |
| 5,571,637 A | 11/1996 | Idota | |
| 5,595,841 A | 1/1997 | Suzuki | |
| 5,691,083 A | 11/1997 | Bolster | |
| 5,756,230 A | 5/1998 | Gao et al. | |
| 6,159,637 A | 12/2000 | Shizuka et al. | |
| 6,190,803 B1 | 2/2001 | Tomiyama et al. | |
| 6,200,707 B1 | 3/2001 | Takada et al. | |
| 6,218,054 B1 | 4/2001 | Webber | |
| 6,291,098 B1 | 9/2001 | Shibuya et al. | |
| 6,306,544 B1 | 10/2001 | Frysz et al. | |
| 6,316,142 B1 * | 11/2001 | Delnick et al. | 429/217 |
| 6,465,126 B1 | 10/2002 | Jannasch et al. | |
| 6,589,299 B2 | 7/2003 | Missling et al. | |
| 6,706,449 B2 | 3/2004 | Mikhaylik et al. | |
| 6,730,136 B2 | 5/2004 | Webber | |
| 6,790,561 B2 * | 9/2004 | Gan et al. | 29/623.5 X |
| 6,849,360 B2 | 2/2005 | Marple | |
| 6,946,220 B2 | 9/2005 | Probst et al. | |
| 6,958,198 B2 | 10/2005 | Iwamoto et al. | |
| 7,033,698 B2 | 4/2006 | Boczer et al. | |
| 7,527,895 B2 | 5/2009 | Boczer et al. | |
| 2002/0127471 A1 | 9/2002 | Siret et al. | |
| 2003/0070283 A1 | 4/2003 | Webber | |
| 2003/0104280 A1 | 6/2003 | Venkatesan et al. | |
| 2003/0113622 A1 | 6/2003 | Blasi et al. | |
| 2005/0277023 A1 | 12/2005 | Marple et al. | |
| 2006/0046152 A1 | 3/2006 | Webber et al. | |
| 2006/0046153 A1 | 3/2006 | Webber et al. | |
| 2006/0046154 A1 | 3/2006 | Webber et al. | |

FOREIGN PATENT DOCUMENTS

| | | |
|---|---|---|
| EP | 1 207 572 A1 | 5/2002 |
| JP | 7-135023 | 5/1995 |
| JP | 2000-106189 | 4/2000 |
| WO | WO 02/073720 A2 | 9/2002 |
| WO | WO 02/073720 A3 | 9/2002 |
| WO | WO 03/105255 A2 | 12/2003 |

OTHER PUBLICATIONS

Ishikawa et al., "In Situ Scanning Vibrating Electrode Technique for the Characterization of Interface Between Lithium Electrode and Electrolytes Containing Additives", Journal of the Electrochemical Society, vol. 141, No. 12, pp. L159-L161, Dec. 1994.

Blake, T.D. et al., "Wetting: Static and Dynamic Contact Lines", *Liquid Film Coating* (Chapman & Hall, London, England, 1997), pp. 63-97.

Coyle, D.J., "Roll Coating", *Modern Coating and Drying Technology* (VCH Publishers, Inc., 1992), pp. 63-116.

Gutoff, E.B., "Premetered Coating", *Modern Coating and Drying Technology*, (VCH Publishers, Inc., 1992), pp. 117-167.

Kistler, S.F. et al., eds., "Chapter 11: Premetered Coating Processes", *Liquid Film Coating* (Chapman & Hall, London, England, 1997), pp. 401-536.

Michaeli, W., *Extrusion Dies for Plastics and Rubber: Design and Engineering Computations* (Oxford University Press, New York, 1992), pp. 77-213.

Padday, J.F., ed., *Wetting, Spreading and Adhesion* (Academic Press Inc., London, England, 1978), pp. 37-82.

Parfitt, G.D., ed., *Dispersion of Powders in Liquids* (Elsevier Publishing Company Limited, Barking, Essex, England, 1969), pp. 1-121.

* cited by examiner

FLEXIBLE CATHODES

CROSS REFERENCE TO RELATED APPLICATIONS

This application is a continuation of and claims the benefit of priority under 35 U.S.C. §120 to U.S. application Ser. No. 12/408,869, filed on Mar. 23, 2009, now U.S. Pat. 7,753,968, which is a continuation and claims the benefit of priority under 35 U.S.C. §120 to U.S. application ser. No. 11/375,537, filed on Mar. 14, 2006, now U.S. Pat. 7,527,895, which is a continuation of and claims the benefit of priority under 35 U.S.C. §120 of U.S. application Ser. No. 10/290,832, filed on Nov. 8, 2002, now U.S. Pat. 7,033,698. The contents of all parent applications are hereby incorporated by reference in their entireties.

BACKGROUND

This invention relates to cathodes for lithium batteries.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

The cathode of the battery can be prepared by applying a slurry containing an active material to a substrate, which can serve as the current collector for the cathode. It is desirable to coat the substrate uniformly, because a uniform coating thickness can promote good battery performance. Certain extrusion processes offer good control of the coating thickness, but cannot be used when the slurry contains materials that fibrillate, and thus become rigid, during the extrusion process.

SUMMARY

The invention relates to methods for making cathodes for lithium batteries, and to the cathodes produced by these methods. The methods include forming a slurry containing active materials, a binder, and a solvent or solvents, coating a flexible current collector with the slurry, then drying and calendering the cathode.

The finished cathodes are very thin and very flexible. Single-sided cathodes (i.e., cathodes in which only one side of the foil is coated with active materials) can be folded 180° to form pleats, or can be wound on small-diameter round or square mandrels, without any cracking or delamination of the coating. Double sided cathodes can be wound as well, without cracking or delamination of the coating. The cathodes are comparable in performance to cathodes made using stainless steel mesh current collectors. The thinness of the current collector allows for the use of increased amounts of active material per volume.

In one aspect, the invention features a cathode for a lithium battery. The cathode includes: (a) a current collector including aluminum foil; and (b) active cathode material including: (i) manganese dioxide; (ii) conductive materials; and (iii) a binder selected from the group consisting of linear di- and tri-block polymers, linear tri-block polymers cross-linked with melamine resin, ethylene-propylene copolymers, ethylene-propylene-diene terpolymers, tri-block fluorinated thermoplastics, hydrogenated nitrile rubbers, fluoro-ethylene-vinyl ether copolymers, thermoplastic polyurethanes, thermoplastic olefins, and polyvinylidine fluoride homopolymers. The binder may be a tri-block copolymer, e.g., styrene-ethylene-butylene-styrene polymer. Alternatively, the binder may be EPDM rubber, a PVDF homopolymer, or a linear tri-block polymer cross-linked with a melamine resin, e.g., styrene-ethylene-butylene-styrene cross-linked with a melamine resin. One or both sides of the current collector, which may consist essentially of aluminum, can be coated with active cathode material.

In another aspect, the invention features a flexible cathode for a lithium battery. The cathode includes: (a) a current collector including aluminum foil; and (b) active cathode material including: (i) manganese dioxide; (ii) conductive materials; and (iii) a binder.

In another aspect, the invention features a method for making a cathode for a lithium battery. The method includes: (a) combining a catalyst, conductive materials, a solvent, and a binder to form a mixture; (b) dispersing the mixture to form a slurry; (c) applying the slurry to a substrate using a solution extrusion process to form a coated substrate; and (d) drying the coated substrate. The method can further include calendering the cathode after step (d).

The substrate can be an aluminum foil, which can be flame treated and coated with a primer prior to step (c). The solvent can be a hydrocarbon solvent, e.g., a paraffinic solvent or an aromatic hydrocarbon solvent.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
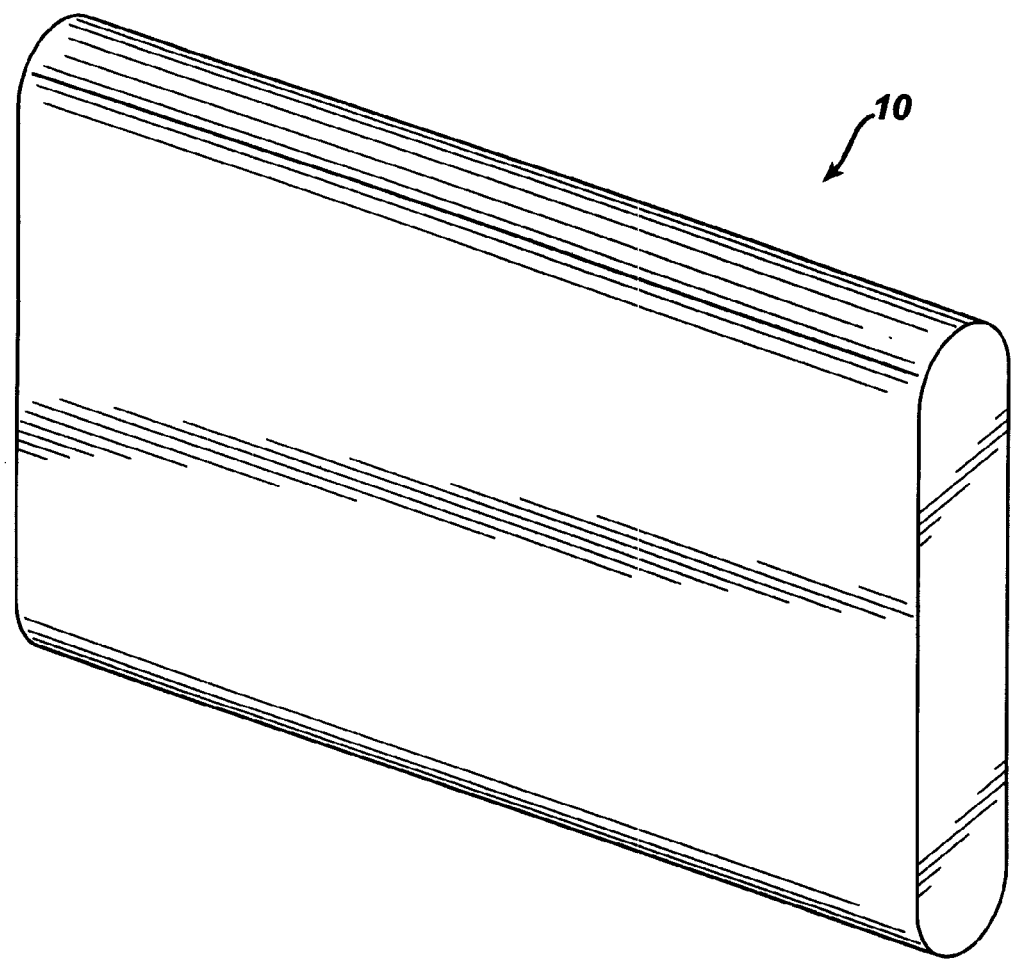
FIG. 1 is a perspective view of a prismatic cell.

An electrochemical cell, such as the prismatic cell 10 shown in FIG. 1, includes an anode in electrical contact with a negative lead, a cathode in electrical contact with a positive lead, a separator, and an electrolytic solution. The anode, cathode, separator, and the electrolytic solution are contained within a case. The electrolytic solution includes a solvent system and a salt that is at least partially dissolved in the solvent system.

The cathode includes an active cathode material. The active material can be, e.g., a metal oxide such as $MnO_2$. Electrolytic manganese dioxide (EMD) is preferred. Other active materials are described in Blasi et al., U.S. Ser. No. 10/022,289, filed Dec. 14, 2001, which is herein incorporated by reference in its entirety. For example, the active material can be iron disulfide. The cathode also includes conductive materials such as carbon black and graphite.

The cathode also includes a binder. It is desirable that the binder be mechanically, thermally, and chemically stable. Examples of binders that can be used include linear di- and tri-block polymers, preferably with no double bonds, or with conjugated double bonds, in the main polymer chain. The binder preferably includes 29 to 33% polystyrene. Other examples include linear tri-block polymers cross-linked with melamine resin; ethylene-propylene copolymers with an ethylene content of at least about 40%; ethylene-propylene-diene terpolymers with ethylene contents below about 70%; tri-block fluorinated thermoplastics (e.g., TFE/HFP/VF2 terpolymer); hydrogenated nitrile rubber with at least about 30% acrylonitrile; fluoro-ethylene-vinyl ether copolymers; thermoplastic polyurethanes (TPU); thermoplastic olefins (TPO); and PVDF homopolymers with molecular weights around 0.5 M.

The binders may be modified to improve properties of the cathode. For example, cross linking or vulcanizing low molecular weight rubber can considerably improve the solvent resistance of the cathode. Actual cross linking can take place in the dryer, during the coating process.

Block copolymers are preferred as binders. Specific examples include Kraton G 1651 (SEBS). Other desirable binders include Royalene 521 (EPDM), Hylar 301 G (PVDF homopolymer) and Kraton G1901 (SEBS cross linked with melamine resin).

Because binders other than polytetrafluoroethylene (PTFE) are used, fibrillation is not necessary to achieve a flexible cathode with good cohesion. Furthermore, extrusion processes with relatively high shear rates can be used, because the risk of fibrillation-related thickness is minimized.

The active material, conductive materials, and binder are combined with a solvent or solvents to form a slurry. In formulating the slurry, the interaction between the binder solution and the active powders (e.g., the manganese dioxide, the carbon black, and the graphite) must be considered. The solvent determines the application rheology for the coating process; solvents are selected to promote defect-free and uniform drying of the cathode. The solvents can also serve as a fugitive plasticizers or latent solvents to control drying.

Preferred solvents include normal and branched hydrocarbons, such as hexane; iso- and cyclic paraffinic solvents such as VM&P Naphtha HT; and aromatic hydrocarbon solvents such as Shell Sol A100. Other hydrocarbon solvents may be used as well. Blends of the solvents may be used as well. For example, a blend may contain 40% by weight of an aromatic hydrocarbon blend; 30% by weight of iso- and cyclic paraffins; and 30% by weight hexane.

A typical slurry formulation contains 1-10%, preferably 2-5%, by weight binder, 50-80%, preferably 60 to 70%, by weight active powders, and 25-40%, preferably 30 to 35%, by weight of solvent(s). On a dry basis, the cathode preferably contains less than about 3% binder by weight, and more than about 97% of the active powders. The slurry solids are preferably 65-75% by weight, and the viscosity range of the slurry is from 25,000 to 45,000 cps. Table 1 shows some typical cathode formulations.

TABLE 1

|  | Cathode slurry | | Dry cathode | |
| --- | --- | --- | --- | --- |
|  | % w | % v | % w | % v |
| Binder | 2.2 | 2.8 | 3.0 | 7.8 |
| Powder mix | 72.6 | 32.8 | 97.0 | 92.2 |
| Solvent blend | 25.2 | 64.4 | 0.0 | 0.0 |
| Total solids | 74.8 | 35.6 | 100.0 | 100.0 |

The cathode also contains a current collector. The current collector is generally an aluminum alloy, e.g., aluminum foil. The type of foil to be used will depend on the equipment used to coat the foil and wind the electrodes. Examples of foils that can be used include alloy #1145, temper H19 at 1.0 mil (0.001 inch) thick, and temper H0 at 1.5 mil thick. The foil can be flame-treated or corona-treated to improve wettability. Both methods can increase the surface energy of foil from 35 Dyne/cm to 68-70 Dyne/cm. A primer can then be applied. Alternatively, foils with primers already applied can be purchased. For example, pre-primed foils can be purchased from Lamart Corp. A preferred current collector is aluminum foil that has been primed with the commercially available water-based primer (Acheson EB 012). The water based primer can be applied using spray, gravure, and intermittent reverse roll coating techniques. The coating weight is preferably 0.5 to 1.0 mg/cm$^2$.

The first step in forming the cathode is to disperse the powders in the binder solution. Slurry formulations can be dispersed using either a ball mill or planetary mixer for bench scale processes (e.g., batch size 0.75 kg), and a Henshel mixer FM 10 for scaled-up processes (e.g., batch size 8 kg). The dispersion time can be between about 0.5 and 1.5 hours. The degree of dispersion is measured with a Hegman gauge. The slurry density is preferably about 1.8-1.9 g/cc; the slurry is preferably about 73-75% by weight solids; the viscosity is preferably about 350-500 P at 10 sec$^{-1}$ at 75° F. The viscosity is measured using a Brookfield DV III, 50 rpm, spindle 7. The slurries made with these dispersion methods can be stable for at least 5 days; some are still usable after eight weeks.

Figure 2:
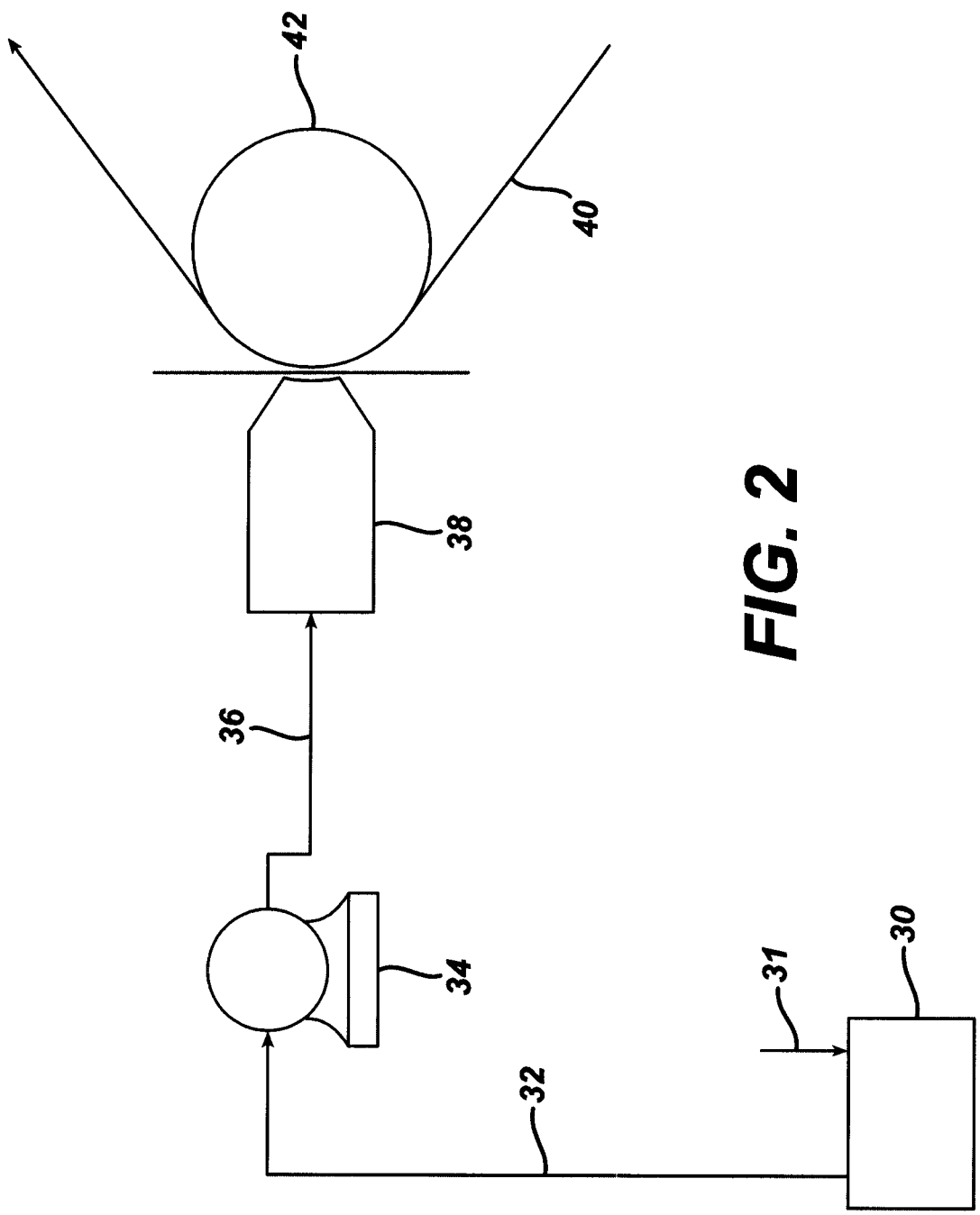
FIG. 2 is a scheme showing a coating process of the invention.

The next step in making the cathodes is to coat the aluminum foil current collector with the slurry. This can be done using a closed, pressurized fluid dispensing system. Referring to FIG. 2, the slurry is pumped into pressure pot 30. Air 31 is pumped into the pot, forcing the slurry through slurry feed line 32. From the slurry feed line, the slurry enters metering pump 34. The metering pump regulates the flow of solution through feed line 36. Line 36 feeds into extrusion die 38. Foil 40, which has been treated as described above, moves over backing roll 42. As the foil passes by the extrusion die, the cathode slurry is applied to the foil. The gap between the extrusion die and the backing roll determines the wet thickness of the coating. The current collector can be coated on one side, or on both sides. For example, the gap between the extrusion die and the backing roll can be set at 14-16 mil for the first pass of the foil. If the foil is 1 mil thick, this setting will result in a coating on one side of the foil of about 7-10 mil, when dry. If the other side is to be coated, the gap between the backing roll and the extrusion die can be set to 23-25 mil. This will result in a current collector in which each side has a coating with a thickness of about 7-10 mil when dry. Since the foil has a thickness of about 1 mil, and each side has a layer of primer about 0.5 mil thick, the total thickness of the dry cathode is 16-22 mil.

A lab coater with a 4-inch wide web can be used. The speed of the backing roller can be set to yield a line speed of 19 cm/minute. A reverse comma coating technique can be used. The basis weight of the dry cathode is optimally 45 to 50 mg/cm$^2$ per side. Solution extrusion methods are further described in Modern Coating and Drying Technology (E. Cohen and E. Gutoff, eds., 1992) and Walter Michaeli, Extrusion Dies (2d rev. ed. 2000).

After coating, the cathode is dried by passing through zones in which heated air is directed at the wet surface of the cathode. The air speed and temperature are gradually ramped from zone to zone. Exemplary temperatures are 45-80° C. and 70-130° C. for zones 1 and 2, respectively. If the cathode is dried too quickly in the first zone, it can be prone to cracking. Exemplary coating and drying process parameters are shown in Table 2.

TABLE 2

|  | Lab-scale process | Pilot-scale process |
|---|---|---|
| Coating technique | Extrusion | Reverse comma |
| Line speed (mpm) | 0.19 | 0.60 |
| Dryer type | Impingement, 2 zone | Impingement, 1 zone |
| Dryer length (m) | 2 × 1.2 | 1 × 4.5 |
| Dryer temperature | T1 = 40-50° C. | T = 80° C. |
|  | T2 = 85-130°0 |  |
| Flow rate (cc/min) | 1.9-2.2 |  |
| Web width (mm) | 89.0 | 152.5 |
| Residual solvent | <0.5% vol |  |

Typically, bench-coated cathodes are considered to pass the drying test if the coating is uniform and defect-free after 15 seconds at room temperature and 3 minutes at 100° C. Analytical tests indicate that no more than 0.5% of residual toluene is present in the dry cathode after this drying schedule.

After drying, the cathode is calendered. Before calendering, the uncoated edges of the cathode are slit off to avoid wrinkling of the coating-free zones. The cathode can be calendered using a 4-roll modified "Z" calendar with a roll width of 12 inches and a roll diameter of 16 inches. The rolls may be heated or cooled as needed. The cathode is preferably calendered off-line, in a continuous mode (e.g., reel-to-reel). A 2×2 roll configuration with two nips, or a 2 roll configuration with one nip can be used. The materials are preferably calendered between room temperature and 60° C. A line speed of 3 feet/minute can be used.

The cathode is calendered to achieve a desired porosity. For example, in some embodiments, a porosity of 30-35% is desired. Other desired features for the calendered cathode include a total coating weight of about 100 mg/cm$^2$ for double-sided cathodes; a density of greater than about 2.85 g/cc; and an extension of no more than about 5%, and preferably about 1.5% to about 2.5%. For cathodes coated on one side only, a green (i.e., dried but not calendered) cathode having a thickness of 7-11 mil is preferably calendered to a total finished thickness of about 6-8 mil (a coating layer of 4.5-6.5 mil, 1 mil thick foil, and a 0.5 mil primer layer).

The finished cathode can be pleated. That is, it can be bent back on itself 180°, such that the two sides contact each other. A cathode that consists of a foil current collector coated on one side was folded with the foil on the outside, and the coating on the inside. After being pleated, the cathode showed no visible cracking.

The finished cathode can also be wound, that is, wound around a mandrel. A cathode consisting of an aluminum foil current collector coated on both sides was wound around a 27.5 mm×0.9 mm mandrel. Visual inspection revealed that the coating was not cracked, even after the cathode was wound, although in some cases the foil may be cracked. Cathodes that can be pleated or wound, as just described, are said to be "flexible." The adhesion of the coating can also be tested using a 10×10 square cross hatch test.

The cathodes can be used in lithium cells, such as the prismatic cell 10 shown in FIG. 1. These cells also include an anode, a separator, an electrolyte, and a container. The anode can consist of an active anode material, such as lithium. The separator can be formed of any of the standard separator materials used in nonaqueous electrochemical cells. For example, the separator can be formed of polypropylene, (e.g., nonwoven polypropylene or microporous polypropylene), polyethylene, and/or a polysulfone. Separators are further described in U.S. Pat. No. 5,176,968.

The electrolyte can be in liquid, solid or gel (polymer) form. The electrolyte can contain an organic solvent such as propylene carbonate (PC), ethylene carbonate (EC), dimethoxyethane (DME), dioxolane (DO), tetrahydrofuran (THF), acetonitrile ($CH_3CN$), gamma-butyrolactone, diethyl carbonate (DEC), dimethyl carbonate (DMC), ethyl methyl carbonate (EMC) dimethylsulfoxide (DMSO) methyl acetate (MA), methyl formiate (MF), sulfolane or combinations thereof. The electrolyte can alternatively contain an inorganic solvent such as $SO_2$ or $SOCl_2$. The electrolyte also contains a lithium salt such as lithium trifluoromethanesulfonate (LiTFS) or lithium trifluoromethanesulfonimide (LiTFSI), or a combination thereof. Additional lithium salts, for example, lithium iodide, that can be included are listed in U.S. Pat. No. 5,595,841, which is hereby incorporated by reference in its entirety. In some embodiments, the electrolyte may contain $LiPF_6$; in other embodiments, the electrolyte is essentially free of $LiPF_6$. The electrolyte also contains a perchlorate salt, which inhibits corrosion in the cell. Examples of suitable salts include lithium, barium, calcium, aluminum, sodium, potassium, magnesium, copper, zinc, ammonium, and tetrabutylammonium perchlorates. Generally, at least 500 ppm by weight of the perchlorate salt is used; this ensures that there is enough salt to suppress corrosion. In addition, less than about 20,000 by weight of the perchlorate salt is generally used. If too much perchlorate salt is used, the cell can be internally shorted under certain conditions during use. The electrolyte is further described in Blasi et al., U.S. Ser. No. 10/022,289, filed Dec. 14, 2001.

To assemble the cell, a separator can be cut into pieces of a similar size as the anode and the cathode and placed between the two. The anode, cathode, and separator are then placed within a case, which can be made of a metal such as nickel, nickel plated steel, stainless steel, or aluminum, or a plastic such as polyvinyl chloride, polypropylene, polysulfone, ABS or a polyamide. The case is then filled with the electrolytic solution and sealed. Additional methods for assembling the cell are described in U.S. Pat. Nos. 4,279,972; 4,401,735; and 4,526,846. Other configurations of battery 10 can also be used, including, e.g., the coin cell configuration.

The invention is further described in the following examples, which do not limit the scope of the invention described in the claims.

Example 1

A cathode was prepared using the techniques described above. The slurry included:

| | |
|---|---|
| styrenic block copolymer (Kraton G1651) | 31.0 g |
| active powder mull mix (EMD, carbon black, graphite) | 1000.0 g |
| aromatic hydrocarbon solvent (Shell Sol A100) | 140.8 g |
| paraffinic solvent (VM&P Naphtha HT) | 105.6 g |
| hexane | 105.6 g |

The slurry was used to coat both primed and unprimed aluminum foil. Cathodes were prepared as described above, and their performance was measured in two test vehicles (2/3A cell and coin cell). The performance of the flexible cathodes was compared to cathodes made with stainless steel expanded mesh current collectors. In the 2/3A cells, the performance of the cathodes was comparable. In the coin cells, the performance for the flexible cathode made using primed foil was comparable to that of the cathode with a stainless steel current collector, but the cathode made with unprimed aluminum foil had a performance 30% below that of the cathode made with the stainless steel current collector. The flexible cathodes could be wound around a 0.177 inch mandrel without cracking and delamination and could be pleated.

Example 2

A cathode was prepared using the techniques described above. The slurry contained:

| | |
|---|---|
| Uncured EPDM rubber (Royalene 521) | 31.0 g |
| Active powder mull mix | 1000.0 g |
| aromatic hydrocarbon solvent (Shell Sol A100) | 194.5 g |
| paraffinic solvent (VM&P Naphtha HT) | 194.5 g |

The flexible cathodes could be wound around a 0.177 inch mandrel without cracking and delamination; the cathodes could also be pleated.

Example 3

A cathode was prepared using the techniques described above. The slurry contained:

| | |
|---|---|
| High molecular weight PVDF (Hylar 301F) | 31.0 g |
| Active powder mull mix (EMD, carbon black, graphite) | 1000.0 g |
| N-methyl pyro | 519.0 g |

The flexible cathode could be wound around a 0.177 inch mandrel without cracking and delamination.

Example 4

A cathode was prepared using the techniques described above. The slurry contained:

| | |
|---|---|
| Styrenic block copolymer (Kraton G1901) | 31.0 g |
| Active powder mull mix | 674.3 g |
| Melamine formaldehyde resin (Cymel 303) | 2.78 g |
| Catalyst (Cycat) | 0.43 g |
| Aromatic hydrocarbon solvent (Shell Sol A10) | 55.4 g |
| VM&P Naphtha HT | 41.6 g |
| Hexane | 41.6 g |

The flexible cathode could be wound around a 0.177 inch mandrel without cracking and delamination.

All publications, patents, and patent applications mentioned in this application are herein incorporated by reference to the same extent as if each individual publication, patent, or patent application was specifically and individually indicated to be incorporated by reference.

Other Embodiments

A number of embodiments of the invention have been described. Nevertheless, it will be understood that various modifications may be made without departing from the spirit and scope of the invention. For example, although the examples described above relate to cathodes for primary (i.e., non-rechargeable) lithium batteries, the invention can be used to prepare cathodes for rechargeable lithium batteries as well. Other embodiments are within the scope of the following claims.

What is claimed is:

1. A method of making a lithium battery, the method comprising:
    (a) coating a slurry comprising iron disulfide, a solvent selected from the group consisting of hydrocarbons and paraffinic solvents, and a binder onto the cathode current collector to form a coated cathode current collector, wherein the binder comprises a polymer selected from the group consisting of linear di- and tri-block copolymers, linear tri-block copolymers cross-linked with melamine resin, ethylene-propylene copolymers, ethylene-propylene-diene terpolymers, tri-block fluorinated thermoplastics, hydrogenated nitrile rubbers, fluoro-ethylene-vinyl ether copolymers, thermoplastic polyurethanes, thermoplastic olefins, and polyvinylidene fluoride homopolymers;
    (b) drying the coated cathode current collector obtained from step (a) to provide a cathode, wherein the cathode comprises no more than 0.5% by volume of the solvent; and
    (c) incorporating the cathode obtained from step (b), an anode comprising lithium, and an electrolyte comprising dimethyloxyethane, dioxolane, and lithium iodide into a housing to form the lithium battery.

2. The method of claim 1, wherein the binder comprises a linear tri-block copolymer.

3. The method of claim 2, wherein the binder comprises a styrene-ethylene-butylene-styrene polymer.

4. The method of claim 1, wherein the cathode current collector comprises aluminum or an aluminum alloy.

5. The method of claim 1, wherein the cathode current collector comprises an aluminum foil.

6. The method of claim 1, wherein the solvent is a hydrocarbon solvent.

7. The method of claim 6, wherein the hydrocarbon solvent is an unbranched hydrocarbon.

8. The method of claim 6, wherein the hydrocarbon solvent is a branched hydrocarbon.

9. The method of claim 6, wherein the hydrocarbon solvent is an aromatic hydrocarbon.

10. The method of claim 1, wherein the solvent is a paraffinic solvent.

11. The method of claim 10, wherein the paraffinic solvent is an iso-paraffinic solvent.

12. The method of claim 10, wherein the paraffinic solvent is a cyclo-paraffinic solvent.

13. The method of claim 1, wherein the coating step comprises applying the slurry onto the cathode current collector using a solution extrusion process.

14. The method of claim 1, wherein the drying step comprises drying the coated cathode current collector in a first heating zone having a temperature of 45° C. to 80° C.

15. The method of claim 14, wherein the drying step further comprises drying the coated cathode current collector in a second heating zone having a temperature of 75° C. to 130° C. after drying the coated cathode current collector in the first heating zone.

16. The method of claim 1, further comprising calendering the cathode after the drying step.

17. The method of claim 16, wherein the cathode is calendered at an elevated temperature.

18. The method of claim 1, wherein the cathode has a thickness of from 16 mil to 22 mil.

19. The method of claim 1, wherein the cathode further comprises a conductive material selected from the group consisting of carbon black and graphite.

20. The method of claim 1, wherein the cathode has a porosity of from 30% to 35%.

21. The method of claim 1, wherein the cathode comprises less than about 3% by weight of the binder.

22. The method of claim 1, wherein the cathode is capable of being wound around a mandrel without forming a crack in the coating of the cathode.

23. The method of claim 1, wherein the slurry comprises about 65-75% by weight solids.

24. The method of claim 1, wherein the cathode is capable of bending 180°.

* * * * *

UNITED STATES PATENT AND TRADEMARK OFFICE
CERTIFICATE OF CORRECTION

| | | |
|---|---|---|
| PATENT NO. | : 7,967,875 B2 | Page 1 of 1 |
| APPLICATION NO. | : 12/791221 | |
| DATED | : June 28, 2011 | |
| INVENTOR(S) | : Christopher Boczer | |

It is certified that error appears in the above-identified patent and that said Letters Patent is hereby corrected as shown below:

On the Title Page, Item (57), Line 2, Delete "batter." and insert --battery--, therefor.

Signed and Sealed this
Eighth Day of November, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,967,875 B2 | |
| APPLICATION NO. | : 12/791221 | |
| DATED | : June 28, 2011 | |
| INVENTOR(S) | : Christopher Boczer et al. | |

It is certified that error appears in the above-identified patent and that said Letters Patent is hereby corrected as shown below:

On the Title Page, Item (75) line 3, Delete "Rosauro Del Rosario" and insert --Rosario Del Rosauro--, therefor.

Signed and Sealed this
Fourteenth Day of February, 2012

David J. Kappos
*Director of the United States Patent and Trademark Office*